United States Patent [19]
Heyman

[11] 3,792,954
[45] Feb. 19, 1974

[54] APPARATUS FOR BAKING AND ROLLING CONFECTIONARY PRODUCTS

[75] Inventor: Albert A. Heyman, Baltimore, Md.

[73] Assignee: Universal Machine Company, Inc., Baltimore, Md.

[22] Filed: Sept. 26, 1972

[21] Appl. No.: 292,441

[52] U.S. Cl. .............................. 425/391, 425/319
[51] Int. Cl. ....................... B29c 17/02, A21c 15/02
[58] Field of Search ......... 425/319, 383, 391, 348 S

[56] References Cited
UNITED STATES PATENTS
3,157,134 11/1964 Heyman .......................... 425/391 X
2,628,576 2/1953 Finke ................................ 425/319
3,086,484 4/1963 Ibex ................................... 425/391

Primary Examiner—J. Spencer Overholser
Assistant Examiner—David S. Safran
Attorney, Agent, or Firm—Birch and Birch

[57] ABSTRACT

Apparatus for baking and molding edible fluid pastry material and rolling it into cones of substantially uniform dimensions with a flat top to facilitate retention of frozen confections such as ice cream, sherbets, and the like and an apex portion in a manner to provide the cone with a reinforced and sealed apex portion. Such apparatus also is made with the ability to provide substantially identical uniformity of the length dimensions of the finished cones for uniformity in stacking and packing the cones.

12 Claims, 8 Drawing Figures

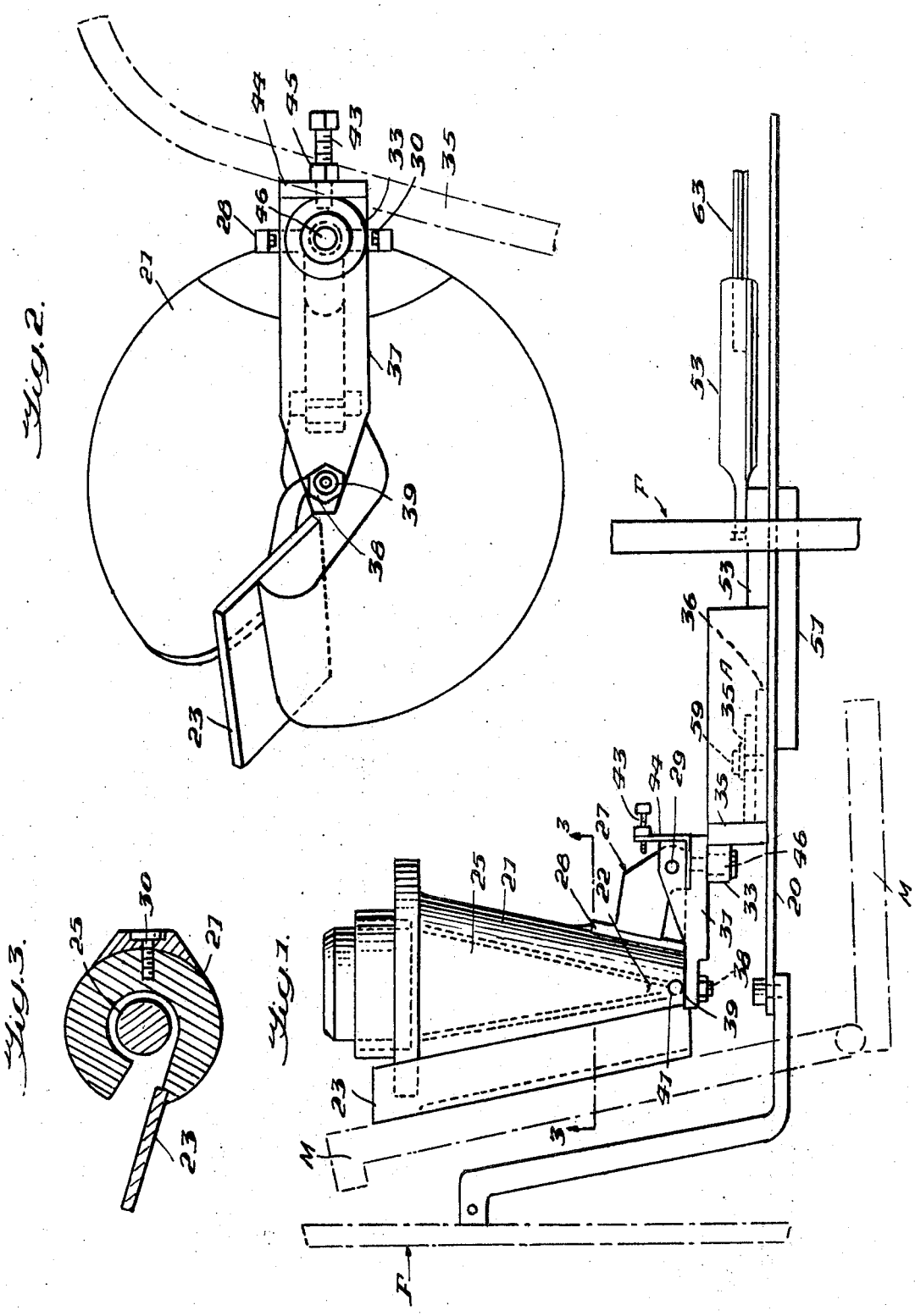

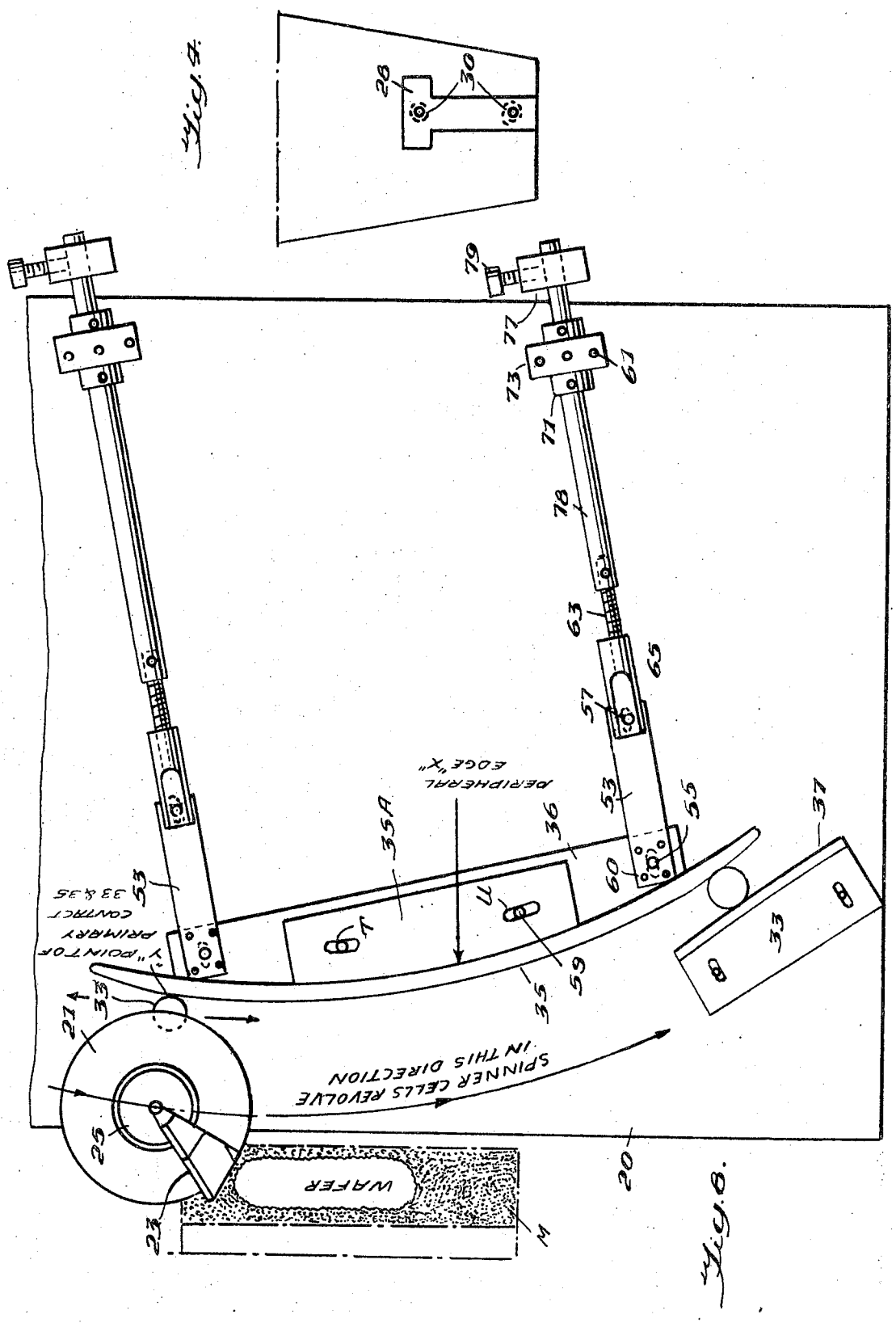

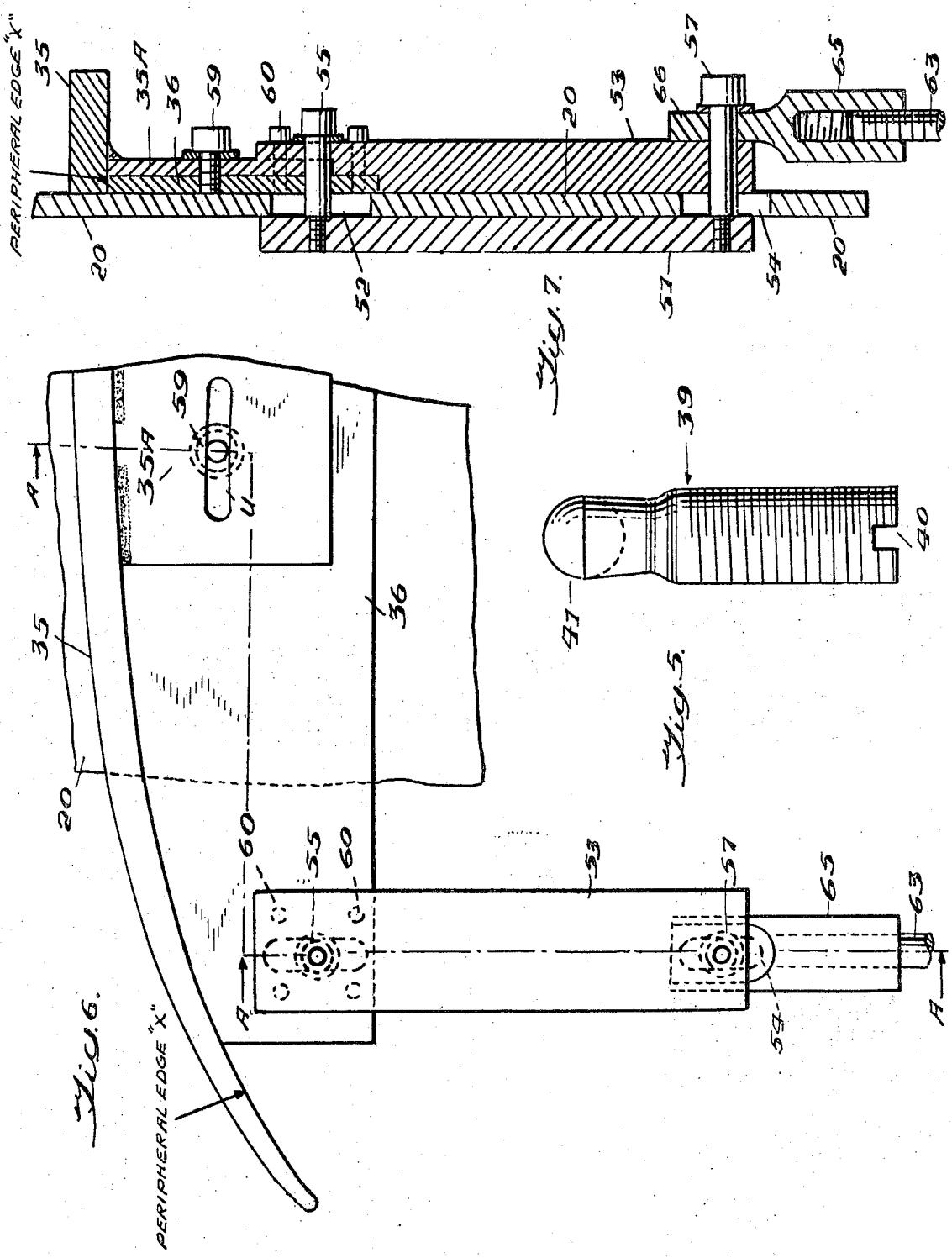

APPARATUS FOR BAKING AND ROLLING CONFECTIONARY PRODUCTS

This invention relates generally to automatic mechanisms used in combination in the manufacture of sugar rolled cones, for example such as in my prior issued U.S. Pat. No. 3,269,335, patented Aug. 30, 1966.

This prior patent generally provides for baking wafers of predetermined contour and rolling them in suitable cone forming molds in coaction with spinners and cam controlled scrapers including means to provide flat top cones. A wafer stripping mechanism is combined with baking molds, see FIG. 1, to transfer these wafers from the baking molds to a wafer rolling or spinner comprising a conical female mold and a male rotary spinner whereby they are spun into conically shaped flat top edible containers. However, with the apparatus of my prior patent the conical bottom tip portions of these molds are open at the bottom apex and the result is such as not to provide uniform cone tips. This lack of uniformity of the finished cones at their tips results in irregular lengths of the finished flat top rolled cones. Also, the pointed bottom tip end of the cones made by my prior patent has often failed to close tightly, which has resulted in leaking of ice cream or such other foods it has been filled with at the bottom tip of the cone.

This invention is to provide a novel rolled sugar cone baking machine preferably to form a cone with a flat top rim as accomplished by my prior patent and to provide a modification of the conical cone forming molds, coacting scrapers and spinners for each mold, by attaching novel cone tip forming mechanism on the same, whereby the finished rolled sugar cone products are each formed with a substantially uniform blunt tip or apex portion sealed to prevent leaking of the products filling the cones and whereby the finished cones are of substantially uniform shape and length for packing in nested relation in packages and resisting breakage.

SUMMARY OF INVENTION

Thus there is provided a novel improvement at the apex of the conical cells or molds with spinning means, such as used for forming rolled sugar cones or the like from wafer means, whereby the apex or point of the cones are each finished off with substantially uniformly sealed blunt ends and whereby when in nested stacked packaging relation to each other have substantially uniform nesting height. Furthermore, since the blunt ends or tips are substantially convex, that is, with rounded tip ends the stacked cones tend to avoid breakage should the cone stack be bent laterally during handling.

More specifically, the object of the present invention is to provide novel tip forming mechanism so arranged and so positioned with respect to the spinner of a rolling machine as to co-act with the same to form a blunt and tighter, stronger tip plus greater uniformity of overall length of the finished product.

Another object is to provide a novel cone tip forming mechanism, operated by suitably programmed cam means whereby the apex end of a spinner mold or cell forms substantially uniform cone tips on the finished products.

Still another object is to provide novel adjustment means to alter the amount of engagement between the tip forming mechanism and the apex portion of the spinning cone mold without stopping the cone baking operation.

Yet another object is to provide a novel rolled cone of the edible sugar cone type, whereby the finished product is formed with an exterior sealed round blunt tip or apex which promotes uniform stacking height and further when the cones are stacked resists breakage from unintentional bending of the stack, because the sealed round blunt tip or apex permits slight universal movement between the adjacent or contiguous blunt tips or apices of the nested cones.

Still another object of the invention is to provide novel means to solidify the rolled material between tip forming mechanism and apex of the spinner core, to thereby form a substantially dense floor upon which the mating or contiguous cone can rest and provide substantial side clearance between adjacent cone walls.

With the above and other objects in view, the present invention consists of the novel construction, arrangement and combination of parts presently described, illustrated in the drawings and defined in the appended claims.

In the drawings:

FIG. 1 is a side elevational view of the cone forming spinner cell with a supporting bracket for the cone tip forming mechanism, the mold, being shown in phantom with an adjacent scraper for removing the wafer from the mold into the spinner cell and novel cooperating actuating means positioned under the tip forming mechanism all of which is supported from the upright main frame members of the machine;

FIG. 2 is a bottom view of the spinner cell and tip forming mechanism with the cam follower shown engaged by the closing cam for the tip forming mechanism shown in phantom;

FIG. 3 is a cross section view taken on section line 3—3 of FIG. 1;

FIG. 4 is a partial view in elevation of the spinner cell at the bracket attaching portion for the cone tip forming mechanism;

FIG. 5 is an elevation view of the adjustable cone tip plunger as shown separated from the tip of the spinner cell;

FIG. 6 is a cut-away view in elevation of the present invention cam adjustment mechanism and mounting plate therefor;

FIG. 7 is a longitudinal cross section view taken on section line A—A of FIG. 6; and FIG. 8 is a top view of the mounting plate, spinner cell and wafer scraper, cam members and mold for the wafer adjacent the scraper.

First, reference is made to my prior U.S. Pat. No. 3,269,335 and with particular reference to the circularly arranged female cone molds identified in the patent as 12 and rotary male spinners 13 with the wafer feed slot 14 extending longitudinally from the rim 16 of the female mold to the apex 18 thereof and the usual scraper blade 17 as shown in my patent. Also the spinner is shown in detail in FIG. 7 of this patent and the frame members for mounting the present invention are identified by the letters F.

The present invention comprises a modification of the female spinner molds at the apex thereof for the purpose of producing a rounded sealed blunt tip or apex to each respective finished cone.

The frame members F of the cone machine support the base plate 20, see FIGS. 1, 6 and 8. This base plate 20 carries the cam support plate 36, the closing cam 35 with its integrally welded subplate 35A and the opening cam 37 described hereinafter. The subplate 35A is formed with curved slots U and T to provide means for circumferential adjustment of the closing cam 35. By these curved slots the best moment in the baking cycle may be chosen for engagement of the convex forming plunger correlated with the speed of the wafer at the moment it enters the spinner cell slot. The area of adjustment on the cam 35 for primary contact between the cam 35 and the cam follower roller 33 is generally indicated by the arrows extending from the follower roller 33 in FIG. 8.

As shown in the present drawings particularly FIGS. 1 and 2, there is shown a typical cone mold 21 and spinner core 25 for sake of brevity hereinafter termed the spinner cell. This spinner cell is equipped with a scraper blade 23, which suitably scoops the wafer, shown in FIGS. 1 and 8, from a baking mold M into the mold or cell 21 and presents it to the spinner core 25 to form a cone in a conical container assembly. This cone at the tip may be formed with a compacted area of cone tip 22, see FIG. 1.

This spinner cone cell 21 at the side thereof adjacent the apex thereof is formed to carry a projecting bracket 27. This bracket includes base 28 secured to the spinner cell by fastener means such as socket head bolts 30, see FIG. 2. The bracket 27 is made so as to have a lower portion in the form of an oscillating lever 31 movable to and from a predetermined adjacent position to the apex of the spinner cell 21, see FIGS. 1 and 2.

The lever 31 is pivoted to the bracket 27 on a hinge pin 29 and has formed on the outboard end thereof with respect to the hinge, a cam follower, such as the roller 33. This roller on the bracket carried lever 31 is programmed by the spinner part of the machine to co-act with spaced cam means 35 and 37, whereby when engaged with the cam 35 causes the lever 31 to swing to contact the end of the spinner cell 21 to close the end of the cell, see FIGS. 1 and 2.

The end of the bracket lever 31 adjacent the spinner cell 21 carries an adjustable cone tip forming means, such as a tip forming plunger 39, see FIGS. 1 and 5. This plunger has a convex end 41 which acts upon the tip of the spinning cone in the spinner cell to form it with a rounded blunt tip which is the desired contour. Also, the convex tip forming plunger 39 is so shaped and so proportioned as to determine the precise position of the tip of the rolled cone vertically in the spinner cell 21 and may be turned for adjustment by a tool in the slot 40 in the lower end thereof and held to such position by lock nut 38.

The oscillating lever has its cam roller or follower 33 positioned so as to move the cone tip forming plunger unit 39 into tip forming position as the spinning cells are moved. After the tip forming is completed the cam roller 33 rides off cam 35 and engages the spaced auxiliary cam 37, to thereby reverse the movement of the lever 31 into open or non-operating position away from the end of the spinner cell, see FIGS. 1 and 8.

As the bracket carried lever 31 is oscillated to nonoperating position with the plunger away from the end of the spinner cell, it is possible at this stage to quickly remove any accumulation of debris without stopping the wafer baking operation and an adjustable stop screw 43 threadable in an end plate 44 may be set to limit the lever 31 for open position from the spinner cell to any suitable amount. The adjustable limit screw 43 and a lock nut 45 thereon abutting the plate 44, determine the extent of the opened position of the lever 31. This adjustment of clearance between the lever cone tip forming plunger 39 and the tip end of the spinner cell 21 becomes important when the machine is first put into operation or whenever the operation becomes faulty due to accumulation of debris in the cell. The proximity of the ball end 41 of the plunger 39, coacting with the adjacent highly polished sloping surfaces of oscillating lever 31 with the apex of the spinner cell 21, is extremely important. At the precise instant when the scraper blade 23 delivers the wafer to the spinner 25, the ball end 41 of the lever 31 should be so timed as to be close enough to the apex of the cell 21 to act as a guide for the entering wafer, yet not to be too close so as to obstruct the speeding wafer from entering. To accomplish this timing the closing mechanism of cam 35 is made adjustable in two directions — one, radially by means of rods 78 and hand knob 77 for changing the relative position of ball 41 vertically in relation to the spinner core 25; and, two, cam 35 is adjustable circumferentially for placing the forming ball 41 into the best timing position relative to the rapidly entering wafer. By adjusting cam 35 on its base plate 36, the ideal timing position for the cam follower 33 can be selected as generally shown in FIG. 8.

The cam roller of follower 33 is mounted on the lever bracket 31 by a shoulder bolt 46 and follows the contour of the programmed closing and opening cams 35 and 37. The cam 35 which is integrally welded to subplate 35A, is slidably guided circumferentially by curved slots T, U and peripheral edge "X" (see FIGS. 6, 7 and 8) which is common to both cam 35 and cam support plate 36 and is fastened to plate 36 by socket head screws 59. This cam support plate 36 and stationary base plate 20 are mounted between plates 51 and 53 with shoulder bolts 55 and 57 which are locked tight in threaded holes of plate 51. Elongated slots 52 and 54 in plate 20 allow the assembly to be moved as a unit when the hand knobs 77 are turned, see FIG. 8. This provides a horizontally slidable unit which enables the operator to alter the vertical position of the tip forming plunger 39, in relation to spinner cell 21. With this adjustable arrangement it is possible to adjust the length of the cone to be produced by minute increments without stopping the baking operation. For example, the top plates 53 at each side of the cam support base 36, see FIGS. 7 and 8, are integrally attached to the cam plate 36 at two positions by fasteners 60, and the bottom plates 51 are tapped and receive the threaded end of shoulder bolts 55 and 57, see FIGS. 7 and 8. These shoulder bolts 55 and 57 are of predetermined, precise lengths so as to maintain the plates 51 and 53 in close proximity with the horizontal support plate 20 of the machine, see FIG. 6, section line A — A. This base support plate 20 is slotted to permit the adjusting unit to move when the threaded rods 63 are turned to the right or left by the operator. Each rod 63 is turnable in the threaded bore of a link 65. This link is formed with a flattened section 66, see FIG. 7, and is secured by a shoulder bolt 57 in the elongated slot 54 of stationary plate 20 at each side of the cam base 36. The threaded rods 63 of the adjusting units at the respective left and right sides of the cam plate are supported at one end by blocks 73 and collars 71 on each rod 78 to prevent the rods 78 from lineal movement. These adjusting units are precisely alike on each side. Thus, when the respective rods 63 are turned, threaded links 65 together with bolts 59, 60, shoulder bolts 55 and 57, top plates 53, bottom plates 51, cam base 36 and cam 35 all move as a unit, forward or backward, to lengthen or shorten the cones in the spinner cell 21 as needed.

To provide for such unitary adjustment, hand operated knob 77 is mounted on the free end of the rod extension 78. Also because both assemblies are identical at both sides, that is on the right and left side of the cam support 36, they are moved substantially the same amount with each forward or rearward adjustment. To assist in the adjustments, a set screw 79 is provided on each side to visually assist the operator to give both identical units, that is, at the right and left, equal peripheral motion in the same direction, clockwise or counterclockwise.

Without further description, it is believed that the novel modifications of the present invention over the prior art are apparent and while only one embodiment is illustrated it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What I claim:

1. A flat top uniform cone forming machine with wafer spinner cells and a spinner core, each spinner cell being open at the apex and including a cone tip forming means mounted outside the cell, and means to move said core tip forming means from its position outside the cell to an operating position in the open apex end of the cell whereby said cones when finished are of uniform shape and length, with formed tip portions to seal and inhibit leaking at the tip of products in the cone and to provide uniform stacking height of the finished cones when in nested relation to facilitate uniform packaging.

2. In a machine of the character described in claim 1, wherein said tip forming means comprises a bracket secured to an exterior side of the spinner cell, and an oscillating lever hinged to said bracket, said lever carrying a cone tip forming plunger into an operating position in the apex opening of the cell.

3. In a machine of the class described in claim 2, wherein said plunger is adjustable in the apex of said spinner, cell to form the cone tip and to control the cone length.

4. In a machine of the class described in claim 2, wherein said lever carries a cam follower engagable with cam means, carried by a rotating part of the machine to thereby open and close the apex of the said cell.

5. In a machine of the class described in claim 2, wherein said plunger comprises a threaded gage portion to adjust the same in the end of the lever at the apex of the said cell.

6. A flat top uniform cone making machine, comprising spinner cells driven in a circular path, each cell having an open apex portion and a rotatable cone forming core within the cell for forming baked wafers into a rolled cone, said cell having a cone tip forming means secured to a side of the cell at the open apex portion, said tip forming means comprising a bracket with an end projecting from the side of the cell, a lever hinged to the projecting end of the bracket, a cam follower carried by the lever engageable with programmed cam means carried by a cam support plate in the path of a rotatable part of the machine carrying the said spinner cell to pivot said lever to and from the apex portion of the spinner cell, and a tip forming plunger carried by an end of said lever for engaging in and out of the open apex of said spinner cone as said cam follower on the opposite end of the lever is engaged periodically with said cam means.

7. A machine of the class described in claim 6, wherein said cam means is comprised of a cam to move said lever to a closed position at the apex, the said respective spinner cells and said cam means being programmed to move said lever to an open position away from the apex of said cell to permit removal of any collected debris in the apex portion of the said cell while the machine operation is continued.

8. A machine of the class described in claim 6, wherein said cam of said cam means for closing said apex of each of the said cells includes adjustable means to vary the engagement of said cam with the cam follower carried by the said lever for each of the cells.

9. A machine of the class described in claim 6, wherein said adjustable means for said cam means comprises spaced threaded rod members, a pair of slotted plate means connected at one end to said cam support plate and coupled by suitable means to said rods at the opposite end, and means for manually turning said threaded rod members clockwise or counterclockwise for adjustment of said cam means with respect to said cam follower.

10. A machine of the class described in claim 6, wherein said cam means are mounted on a slotted support plate secured to the frame of the machine and are spaced and programmed to contact the said cam follower carried on an end of said lever as the spinner cells traverse a circular path, whereby one of the cam means moves the lever and closes the end of the cell and the other cam means engages the cam follower to reverse the movement of the lever to move the lever away from the end of the cell.

11. A machine of the class described in claim 6, wherein said lever of the said bracket includes a set screw plate and a set screw to limit the throw of the lever with respect to the apex of each of the said cells.

12. A machine of the class described in claim 9, wherein said adjustable means for said cam means are positioned on left and right hand sides of the said cam support plate and said means for turning said threaded rod members includes visual means to provide for substantially uniform adjustment of each of said rod members with respect to each other.

* * * * *

UNITED STATES PATENT OFFICE
CERTIFICATE OF CORRECTION

Patent No. 3,792,954  Dated February 19, 1974

Inventor(s) Albert A. Heyman

It is certified that error appears in the above-identified patent and that said Letters Patent are hereby corrected as shown below:

Claim 3, line 3, delete the comma (,).

Signed and sealed this 6th day of August 1974.

(SEAL)
Attest:

McCOY M. GIBSON, JR.
Attesting Officer

C. MARSHALL DANN
Commissioner of Patents